United States Patent [19]

Brown et al.

[11] Patent Number: 5,342,511
[45] Date of Patent: Aug. 30, 1994

[54] OIL FILTER WITH INNER AND OUTER COAXIAL FILTER ELEMENTS

[75] Inventors: Gene W. Brown; Troy McConaughey, both of Kearney, Nebr.

[73] Assignee: Baldwin Filters, Inc., Kearney, Nebr.

[21] Appl. No.: 85,911

[22] Filed: Jul. 6, 1993

[51] Int. Cl.$^5$ .................... B01D 27/08; B01D 27/10
[52] U.S. Cl. .................... 210/137; 210/342; 210/440; 210/450; 210/452; 210/DIG. 13
[58] Field of Search .............. 210/130, 137, 315, 342, 210/440, 450, 452, DIG. 13

[56] References Cited

U.S. PATENT DOCUMENTS

| | | | |
|---|---|---|---|
| 3,269,541 | 8/1966 | Neely | 210/315 |
| 3,822,787 | 7/1974 | Shaltis et al. | 210/440 |
| 5,078,877 | 1/1992 | Cudaback et al. | 210/342 |

FOREIGN PATENT DOCUMENTS

| | | | |
|---|---|---|---|
| 733817 | 5/1966 | Canada | 210/315 |
| 13489 | 11/1978 | Japan | 210/315 |

Primary Examiner—Matthew O. Savage
Attorney, Agent, or Firm—Leydig, Voit & Mayer

[57] ABSTRACT

A filter assembly for an internal combustion engine includes inner and outer coaxial filter elements disposed in a spin-on canister which is detachably secured to a mounting adaptor. Oil from the crankcase is filtered by the outer filter element and a substantial volume of the filtered oil flows to the primary lubricating circuit of the engine. A small percentage of the filtered oil is subjected to further filtration by the inner filter element and is returned directly to the crankcase. A single gasket including a sealing ring and a concentrically disposed tubular fitting attached to the sealing ring by support legs is positioned to prevent commingling of the oil from the crankcase with oil filtered by the outer filter element and to prevent the oil filtered by the outer filter element from commingling with oil filtered by the inner filter element. In addition, the inner filter element is provided with a warm-up orifice to insure oil flow regardless of the condition of the inner and outer filter elements.

11 Claims, 3 Drawing Sheets

OIL FILTER WITH INNER AND OUTER COAXIAL FILTER ELEMENTS

BACKGROUND OF THE INVENTION

This invention relates to a lubricating oil filter assembly of the type used on internal combustion engines. More specifically, the invention relates to a filter assembly having a spin-on or disposable type filter cartridge adapted to be secured to a mounting adaptor on an engine having two lubricating circuits.

Even more specifically, the invention pertains to a filter assembly of the same general type as disclosed in Cudaback et al U.S. Pat. No. 5,078,877. In the Cudaback et al filter assembly, oil from the crankcase is filtered by an outer filter element and a substantial volume of the filtered oil flows to the primary lubricating circuit of the engine. A small percentage of the filtered oil is subjected to further filtration by an inner coaxial filter element and is returned directly to the crankcase. A tubular fitting extends between end caps on the two coaxial filter elements to establish communication between the inner filter element and the mounting adaptor, to separate the two flow circuits, and to maintain a fixed axial spacing between the two filter elements.

The two filter elements include filter media and Plastisol potting compound. When the media is in the form of pleated cellulose paper, both the media and the Plastisol require high temperature heating after the filter elements have been manufactured in order to cure the media. The heating process imparts moisture resistance and structural strength to the filter media and seals the elements to the end caps to prevent contamination from eluding the filtering media.

In the Cudaback et al filter assembly, the design of the end caps and the tubular fitting prevents the two filter elements from being cured individually before being assembled with one another. If the filter elements are cured after being assembled, the outer filter element acts as a heat shield with respect to the inner filter element and thus substantial time is required to complete the curing process. This problem cannot be solved by curing the inner element before it is assembled with the outer element because, under such circumstances, the inner element acts as a heat sink once it is assembled with the outer element and as the outer element is being cured. Regardless of how the curing is effected, one end cap of the outer filter element of the Cudaback et al construction cannot be installed until after the inner filter element has been inserted into the outer filter element.

In some filters, the filter media of the outer filter element is a synthetic material such as micro-glass which is sandwiched between and supported by polyester scrim. The scrim cannot withstand the high temperatures necessary to cure the less expensive cellulose paper of the inner filter element and thus, when the outer filter element uses synthetic filter media, it is essential that the inner filter element be cured prior to being assembled with the outer filter element. In the filter assembly of the Cudaback et al patent, the requirement of installing an end cap on the outer filter element after the inner filter element has been inserted into the outer element is a major drawback even if the outer element uses synthetic filter media.

One of the end caps of the outer filter element of the Cudaback et al filter assembly is a deep drawn component with punched holes defining flow passages and thus manufacture of the end cap is relatively complex and expensive. Moreover, the Cudaback et al filter suffers from the standpoint that the flow through the inner filter element may be reduced below an acceptable rate under cold start conditions or if either filter element becomes excessively clogged.

SUMMARY OF THE INVENTION

The general aim of the present invention is to provide a coaxial element filter assembly which, when compared with prior assemblies of the same general type, is less complex, more easily assembled and thus less costly, while avoiding problems associated with cold starts and clogged filter elements.

A further object is to provide a filter assembly of the foregoing type in which the two filter elements may be separately and completely manufactured prior to being assembled with one another. By virtue thereof, microglass or some other non-cellulose material may be used as the filter media for the outer filter element.

A related object of the invention is to provide a filter assembly in which coaxial filter elements with cellulose filter media may be individually cured prior to being assembled with one another so as to significantly reduce the time required for the curing and assembly operations.

Another object is to provide a filter assembly of the above type in which the outer filter element utilizes more easily manufacturable end caps.

In a more detailed sense, the invention resides in the provision of a combined filter assembly having inner and outer filter elements with uniquely constructed end caps which permit oil flow when the outer element is clogged as well as during cold starts and with a unique gasket which separates the oil contained in the two oil circuits at reduced manufacturing and assembly costs.

These and other objects and advantages of the invention will become more apparent from the following detailed description when taken in conjunction with the accompanying drawings.

DETAILED DESCRIPTION OF THE PREFERRED EMBODIMENT

Figure 1:
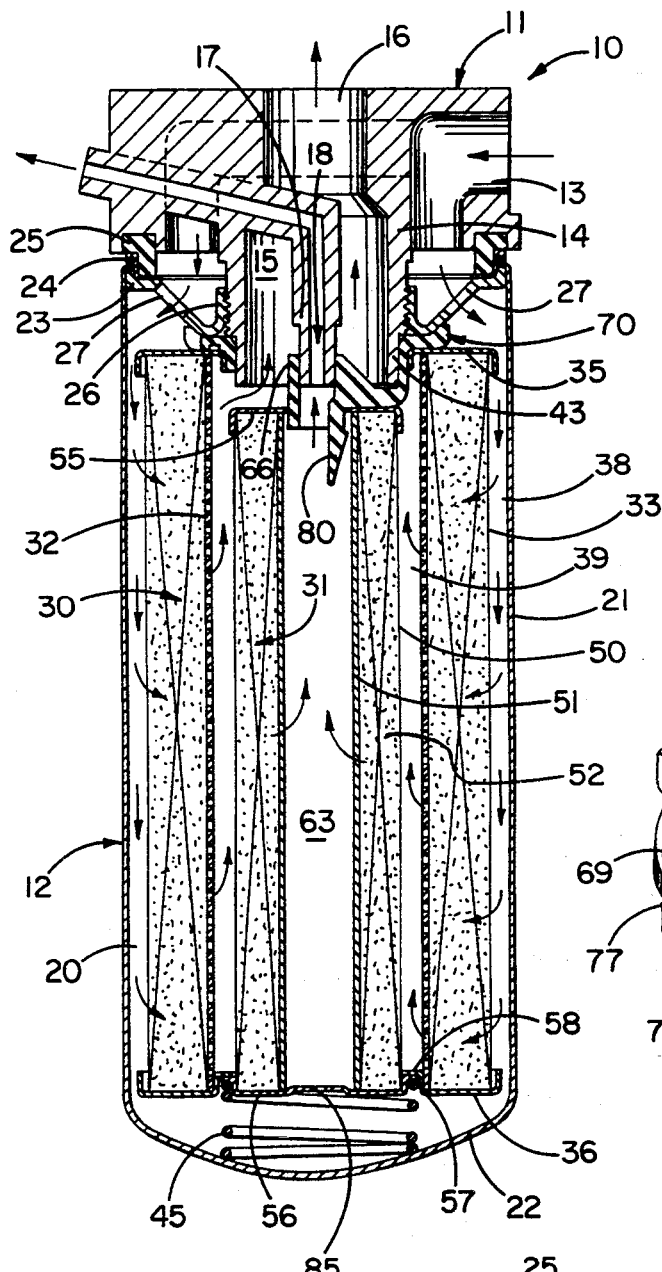
FIG. 1 is a cross-sectional view taken axially through a new and improved filter assembly incorporating the unique features of the present invention.

For purposes of illustration, the invention has been shown in the drawings as incorporated in an oil filter assembly 10 of the type used on an internal combustion engine. The filter assembly of the present invention is particularly adapted for use with an engine having two separate lubricating oil circuits. By way of example, oil from the crankcase may be filtered and then a substantial percentage of such oil may flow through a primary circuit to the engine bearings. A substantially smaller percentage of the filtered oil may be subjected to a second stage of filtration to remove fines and then may be returned directly to the crankcase.

In general, the filter assembly 10 comprises two primary components, namely, (A) a mounting adaptor 11 which is attached permanently to the engine and (B) a spin-on or disposable cartridge 12 which is adapted to be secured releasably to the adaptor. The adaptor includes an inlet 13 for receiving contaminated oil from the crankcase and for introducing such oil into the cartridge. Formed integrally with and depending from the adaptor is an externally threaded neck 14 which is tubular and which defines an outlet 15 that communicates with an outlet port 16 for discharging oil in one of the circuits to the bearings of the engine. Coaxial with and located within the neck 14 is a conduit or stem 17 which defines an outlet 18 for the oil of the other lubricating oil circuit.

The cartridge 12 includes a deep canister 20 made of sheet metal and having a cylindrical side wall 21 and a domed end wall 22 integral with one end of the side wall. The opposite end of the canister is open when the canister is formed but is adapted to be closed by a separate end plate 23 which is held in assembled relation with the canister by means of an annular sheet metal retainer 24. A resiliently yieldable ring 25 is captivated by the retainer and seals against the adaptor 11 when the cartridge 12 is attached to the adaptor. To effect such attachment, the end plate 23 is formed with an internally threaded collar 26 which is adapted to be screwed onto the neck 14.

Several angularly spaced inlet openings 27 are formed through the end plate 23. The inlet openings communicate with the inlet 13 of the adaptor 11 and deliver contaminated oil into the canister 20.

Two filter elements 30 and 31 are located in compact coaxial relation within the canister 20. The filter element 30 serves to clean the oil flowing to the engine bearings while the filter element 31 effects more complete filtration of oil which flows directly to the crankcase. As will become more apparent subsequently, the two filter elements are arranged to allow filtered oil to flow to the two circuits while isolating each circuit from the other.

In the present instance, the filter element 30 constitutes the outermost element and is of tubular construction. The filter element 30 consists of an inner perforated core 32 which supports a suitable and relative coarse filter media such as pleated cellulose paper. In high performance applications, however, the filter media may be a more expensive synthetic material such as micro-glass which is sandwiched between and supported by sheets of polyester scrim. End caps 35 and 36 are located at the ends of the filter media and captivate the media against the core. A heat-curable adhesive such as Plastisol is used to secure the end caps to the filter media.

The outer side of the filter media 33 of the element 30 is spaced inwardly from the inner side of the canister 20 and coacts therewith to define an annular chamber 38. Oil in the chamber flows radially through the media 33 and is cleaned thereby before flowing through the core 32 and into a chamber 39 defined by the interior of the tubular filter element 30. A substantial volume of the filtered oil is discharged from the chamber 39 by way of the outlet 15 of the adaptor 11 to the outlet port 16 and then to the engine bearings.

Figure 2:
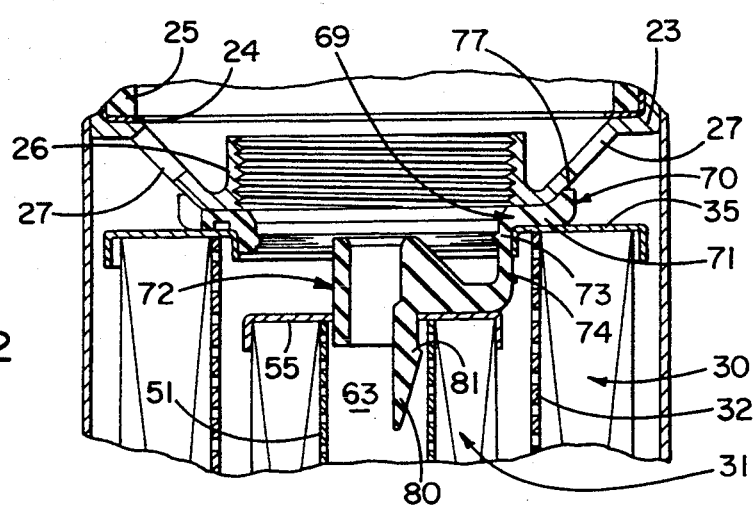
FIG. 2 is an enlarged fragmentary cross-sectional view of certain components shown in FIG. 1.

In accordance with one aspect of the invention, a unique gasket 70 prevents dirty oil at the inlet openings 27 from flowing directly into the chamber 39 and forces such oil to flow through the filter media 33 to reach the chamber 39. As shown most clearly in FIG. 2, the gasket 70 includes a sealing ring 69 having a radially extending portion 71 which is sandwiched between the end plate 23 and the end cap 35 and an axially extending portion 73 which is adapted to contract around an extension 43 of the threaded neck 14 (see FIG. 1). A coil spring 45 is located in the canister 20 between the closed end 22 thereof and the end cap 36 of the filter element 30 and urges the end cap 35 against the sealing ring 69 of the gasket 70 so as to compress the sealing ring between the end cap 35 and the end plate 23. The gasket is made of soft and flexible rubber-like material.

Figure 3:
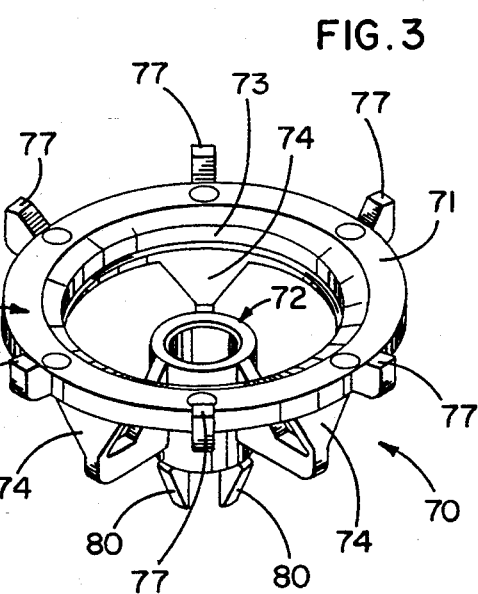
FIG. 3 is a perspective view of the sealing gasket of the filter assembly.
Figure 4:
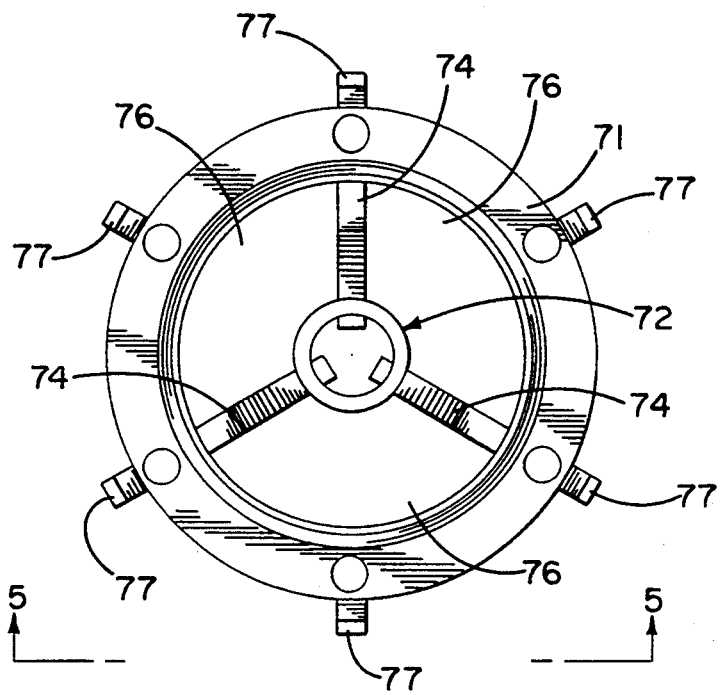
FIG. 4 is an enlarged top plan view of the gasket.
Figure 6:
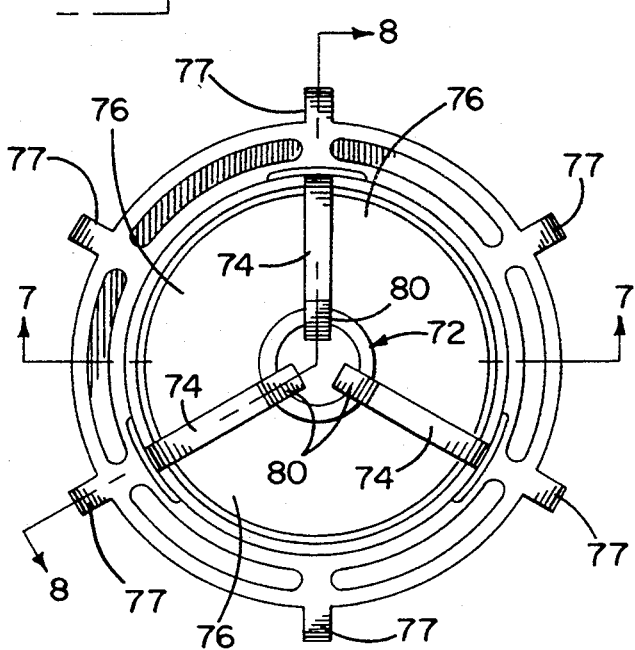
FIG. 6 is a bottom plan view taken substantially along the line 6—6 of FIG. 5.
Figure 7:
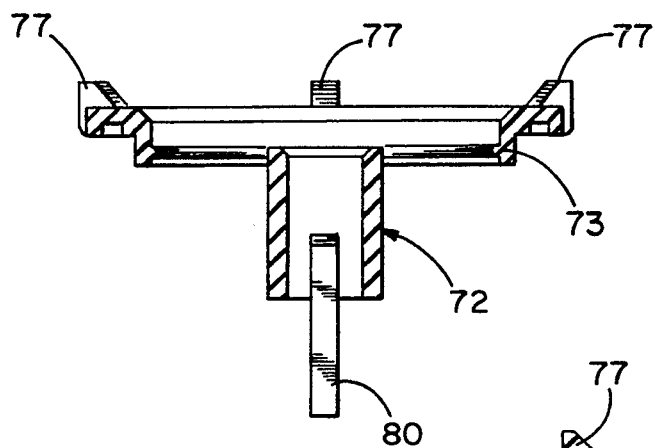
FIG. 7 is a cross-sectional view taken substantially along the line 7—7 of FIG. 6.
Figure 8:
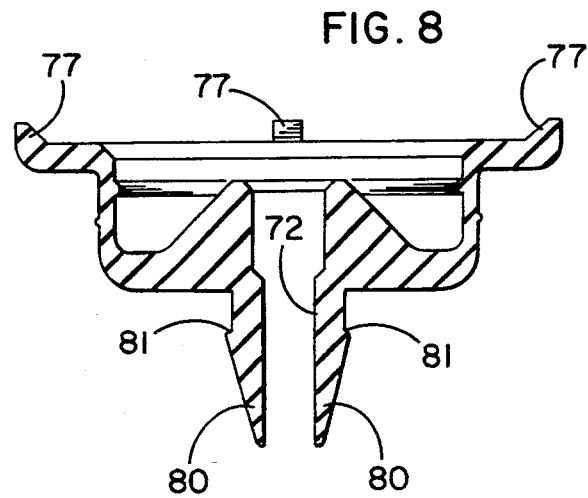
FIG. 8 is a cross-sectional view taken along the line 8—8 of FIG. 6.

In carrying out the invention, the gasket 70 includes a number of support legs 74 which depend from the sealing ring 69. As best seen in FIG. 3, the support legs 74 preferably include axially extending portions and radially extending portions which serve to support a centrally located tubular fitting 72 whose use will become clear momentarily. As most easily seen in FIGS. 4 and 6, the gasket 70 preferably includes three such support legs 74. The support legs are spaced angularly from one another and define three relatively large openings 76 which establish communication between the chamber 39 and the outlet 15 of the adaptor 11 in order to enable the substantial volume of oil filtered by the outer tubular filter element 30 to flow to the outlet port 16 and eventually to the engine bearings.

Figure 5:
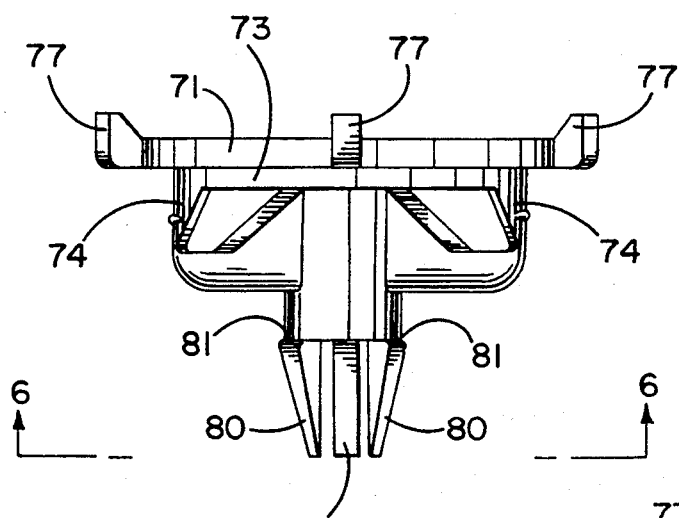
FIG. 5 is an elevational view taken substantially along the line 5—5 of FIG. 4.

As most easily seen in FIG. 5, the support legs 74 are preferably disposed beneath the circular opening defined by the sealing ring 69 of the gasket 70. Further, the sealing ring 69 is formed with locating lugs 77 which engage the end plate 23 to aid in positioning the end plate during assembly.

The filter element 31 is located in the chamber 39 and is coaxial with the filter element 30. The filter element 31 includes an outer wrapper 50, a perforated inner core 51 and a relatively fine pleated cellulose paper filter media 52 located between the wrapper and the core. The outer wrapper 50 could be perforated along its entire length but it preferably is perforated only over about a one inch length located near the midportion of the wrapper.

The components 50–52 of the filter element 31 are sandwiched between a pair of end caps 55 and 56 which are bonded to the filter media 52 by Plastisol and which captivate the filter media against the core 51. The end cap 56 includes a flat circular outer rim 57 (FIG. 10) which projects radially inwardly into overlapping relation with a similarly flat circular inner rim 58 projecting radially outwardly from the annular end cap 36, there being an annular sealing gasket 59 sandwiched between the two rims. Importantly, the end cap 36 is in the form of a ring having a central opening 60 for receiving the lower end portions of the components 50–52 of the filter element 31.

Figure 9:
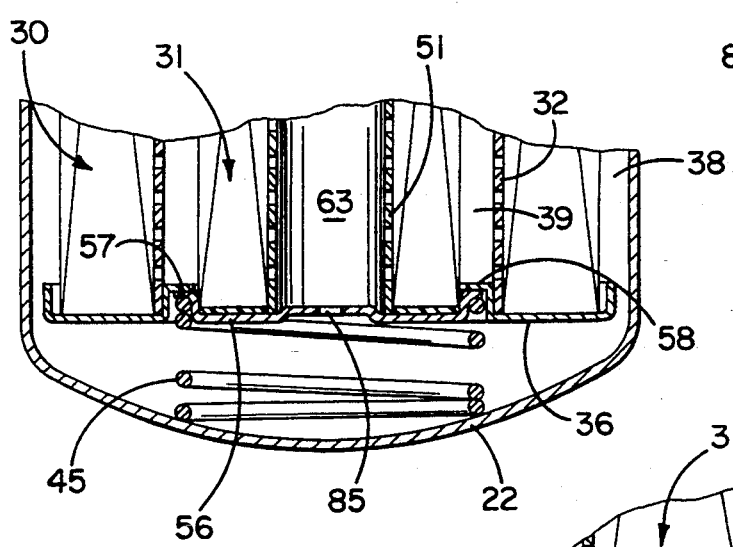
FIG. 9 is an enlarged fragmentary cross-sectional view primarily illustrating the end caps of the filter elements.
Figure 10:
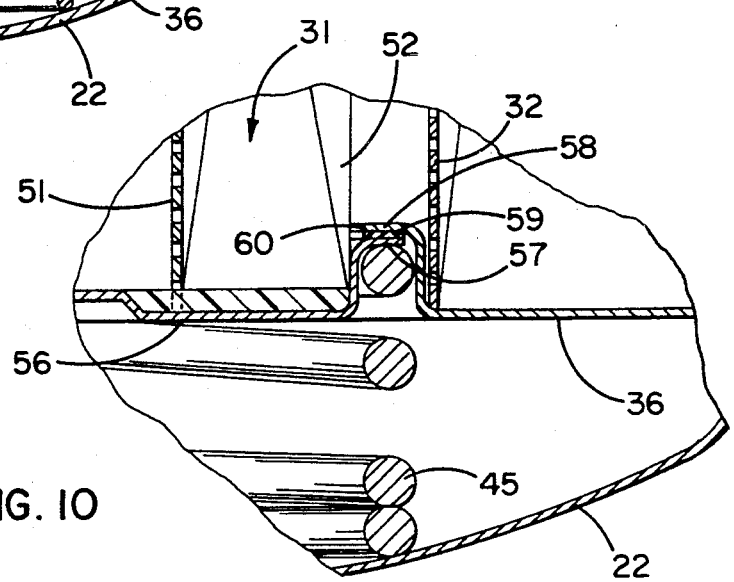
FIG. 10 is an enlarged fragmentary cross-sectional view of certain components shown in FIG. 9.

As illustrated in FIGS. 9 and 10, the rims 58, 57 of the end caps 36, 56 preferably coact to define an annular cavity for receiving the spring 45 which urges the end cap 35 against the sealing ring 69 of the gasket 70 as discussed above. It will be appreciated by those skilled in the art that the overlap of the rims 57, 58 effectively transfers any upward axial forces applied to the inner filter element 31 to the outer filter element 30 so that only small axial forces are exerted on the legs 74 by the end cap 55.

The outer diameter of the inner filter element 31 is considerably less than the inner diameter of the outer filter element 30 and thus the presence of the filter element 31 causes the chamber 39 to be of annular configuration. Some of the filtered oil in the annular chamber 39 flows radially through the filter media 52 of the inner filter element 31 and flows to a chamber 63 defined by the interior of the inner filter element. In keeping with the invention, the tubular fitting 72 of the gasket 70 communicates with the chamber 63 and directs such oil to the adaptor 11 while keeping the oil separated from the oil flowing from the chamber 39 through the openings 76 defined by the support legs 74. In this instance, the fitting is formed with angularly spaced and downwardly projecting fingers 80 which telescope through the end cap 55 into the chamber 63. Each finger 80 is preferably formed with a beveled lower edge which assists insertion into the chamber 63 but which culminates in a stepped shoulder 81 having a relaxed outer diameter which is larger than the aperture in the end cap 55. When the cartridge 12 is attached to the adaptor 11, the upper end portion 66 of the tubular fitting telescopes over and seals against the stem 17 so as to establish communication between the interior chamber 63 of the filter element 31 and the outlet 18 of the adaptor.

With the foregoing arrangement, dirty oil from the inlet 13 flows through the inlet openings 27 in the end plate 23 and into the canister 20. The end plate 23, the end cap 35, the gasket 70 and the extension 43 coact to prevent the dirty oil from flowing directly to the interior chamber 39 of the filter element 30 and force the oil to flow to the outer chamber 38 for subsequent radial flow through the filter media 33 to the chamber 39. Most of the oil in the chamber 39 flows to the adaptor 11 via the openings 76 in the gasket 70 and is prevented by the end cap 55 and the tubular fitting 72 from flowing directly to the interior chamber 63 of the filter element 31. The remaining oil in the chamber 39 flows radially and then axially through the relatively fine filter media 52 of the inner filter element 31 for removal of additional contaminants, the volume of oil flowing through the filter media 52 being limited since only a relatively short length of the outer wrapper 50 of the inner filter element is perforated. The clean oil then is discharged from the chamber 63 via the fitting 72 and flows to the outlet 18 of the adaptor 11.

In accordance with another aspect of the invention, the end cap 56 includes a small warm-up orifice 85 (FIG. 9) in its center to permit unfiltered oil to flow directly from the annular chamber 38 to the chamber 63 within the inner filter element 31. The warm-up orifice 85 allows the inner filter element 31 to permit oil to flow when either of the filter elements 30, 31 is plugged. The inner filter element 31 will, therefore, always permit oil flow regardless of the condition of the inner and outer filter elements 30, 31. Indeed, in the preferred embodiment, the warm-up orifice 85 insures that the inner filter element 31 will always allow flow at least approximately 0.50 gallons per minute.

Further, the overlapping rims 58, 57 of the end caps 36, 56 of the outer and inner filter elements 30, 31 prevent the inner filter element 31 from being forced upwardly by the high pressure differentials generated during cold starts, such differentials sometimes being on the order of 150 psi. Since the inner filter element 31 is not forced upwardly, the tubular fitting 72 and the support legs 74 of the gasket 70 are likewise not subjected to significant axial forces. Instead, any axial forces are transferred to the outer filter element 30 and ultimately to the sealing ring 69 and the end plate 23.

With the construction described above, each of the filter elements 30 and 31 may be individually heated before assembly to a relatively high temperature (e.g., 350 degrees F.) in order to cure the cellulose filter media 33 and 52, respectively, and impart moisture resistance to the media. As a result of being able to separately heat and cure the filter elements prior to the elements being assembled with one another, a significantly shorter curing time is possible than is the case with a construction which requires that the filter elements be cured as a unit. Also, the filter elements may be completely manufactured prior to being assembled with one another and this significantly decreases the complexity of the manufacturing and assembly operations even when the filter media 33 is a synthetic material.

The filter elements 30 and 31 may be assembled with one another simply by inserting the inner filter element into the outer filter element through the opening 60 in the lower end cap 36 of the outer filter element. Thereafter, the filter elements may be inserted as a unit into the canister 20 until the spring 45 seats in the annular cavity defined by the overlapping rims 57 and 58. The sealing gasket 70 then may be assembled by snapping the fingers 80 thereof into the apertured end cap 55 followed by insertion of the fitting 72 into that end cap and telescoping of the legs 74 into the apertured end cap 35. The fitting 72 and the legs 74 coact to keep the filter element 31 centered within the filter element 30 while the shoulders 81 of the fingers 80 coact with the end cap 55 to capture the gasket 70 axially prior to assembly of the end plate 23 and the retainer 24 in that order, the lugs 77 serving to center the end plate during its assembly.

Because flow passages 76 are formed in the gasket 70 itself, the end cap 55 need not be formed with holes for allowing oil to flow from the chamber 39 to the adaptor 11 and thus the end cap may be of a relatively shallow and simple stamped construction and need not be deep drawn. Also, the single gasket 70 not only forces unfiltered oil from the inlet openings 27 to flow into the chamber 39 via the filter media 33 but also forces oil from the chamber 39 to flow into the chamber 63 via the filter media 52. These factors, together with the ability to individually cure the filter elements 30 and 31, enable the filter cartridge 12 to be manufactured at relatively low cost.

We claim:

1. An oil filter cartridge comprising a canister having an open end and an opposite end, an end plate on the open end of said canister, inlet ports in said end plate for admitting oil into said canister, a first tubular filter disposed in said canister in radially spaced relation therewith whereby oil in said canister may flow radially through said filter to the interior thereof, a first end cap on one end of said first filter and isolating the interior thereof from direct communication with said inlet ports, said first end cap including a central aperture, a one-piece gasket including a sealing ring and a tubular fitting, said gasket having connecting means separate from said first end cap and integral with said sealing ring and said tubular fitting and joining said sealing ring and said tubular fitting to one another such that said tubular fitting and said sealing ring are concentrically disposed, said sealing ring being disposed between said first end cap and said end plate for preventing direct communication between the interior of said first filter and said inlet ports, said connecting means extending through said central aperture and including at least one opening between said sealing ring and said tubular fitting for permitting oil in the interior of said first filter to flow out of said canister, a second tubular filter telescoped into and coaxial with said first filter and located in radially spaced relation with said first filter whereby oil in the interior of said first filter also may flow radially through said second filter to the interior thereof, a second end cap on one end of said second filter and isolating the interior thereof from direct communication with the interior of said first filter, said tubular fitting of said gasket extending through and being sealed to said second end cap and communicating with the interior of said second filter to discharge oil therefrom for flow out of said canister while coacting with said second end cap to isolate the interior of said second filter from direct communication with the interior of said first filter.

2. An oil filter cartridge as defined in claim 1 in which said tubular fitting of said gasket is centered with respect to said sealing ring to establish a predetermined radial spacing between said first and second filters.

3. An oil filter cartridge as defined in claim 1 in which said connecting means of said gasket comprises three angularly spaced support legs extending between said sealing ring and said tubular fitting.

4. An oil filter cartridge as defined in claim 1 in which the outer diameter of said tubular fitting is smaller than the outer diameter of said sealing ring.

5. An oil filter cartridge as defined in claim 1 in which said sealing ring includes locating lugs for assisting the positioning of said end plate during assembly.

6. An oil filter cartridge as defined in claim 1 further including a third end cap on a second and opposite end of said second filter, and a fourth end cap on a second and opposite end of said first filter, said third end cap partially overlapping said fourth end cap to transfer any axial forces from said second filter to said first filter.

7. An oil filter cartridge as defined in claim 6 further comprising a spring for biasing said third end cap against said fourth end cap.

8. An oil filter cartridge as defined in claim 6 in which said third end cap includes a warm-up orifice for permitting oil to flow directly from said inlet ports to the interior of said second filter.

9. An oil filter cartridge comprising a canister having an open end and an opposite closed end, an end plate on the open end of said canister, a first tubular filter disposed in said canister in radially spaced relation therewith, there being a first annular flow chamber between said canister and said first filter, a second tubular filter telescoped into and coaxial with said first filter and located in radially spaced relation with said first filter, there being a second annular flow chamber between said first and second filters, inlet means for admitting oil into said canister, means for preventing unfiltered oil from said inlet means from flowing directly into the interior of said first filter whereby such oil is forced to flow into said first flow chamber and through said first filter to said second flow chamber, means for permitting oil in said second flow chamber to flow out of said canister, means for preventing oil in said second flow chamber from flowing directly to the interior of said second filter whereby such oil is forced to flow through said second filter to the interior thereof and means for permitting oil in the interior of said second filter to flow out of said canister, said first and second filters having first and second end caps, respectively, located adjacent the closed end of said canister, said first end cap having an opening therein receiving a portion of said second filter, a spring acting between the closed end of said canister and said second end cap, and means on said second end cap for transmitting the force of said spring to said first end cap, said means on said second end cap comprising a radially outwardly projecting rim, said first end cap having a radially inwardly projecting rim overlapping the rim of said second end cap, first means integral with and extending axially of said first end cap for connecting said first end cap to said inwardly projecting rim, second means integral with and extending axially of said second end cap for connecting said second end cap to said outwardly projecting rim, wherein said first and second means and said outwardly projecting rim are configured and arranged to define an annular cavity for receiving one end portion of said spring such that said one end portion of said spring is radially sandwiched between said first and second filters.

10. An oil filter cartridge as defined in claim 9 further including a warm-up orifice formed through said second end cap and establishing direct communication between said first flow chamber and the interior of said second filter whereby unfiltered oil from said inlet means may flow directly to the interior of said second filter.

11. An oil filter cartridge comprising a canister having an open end and an opposite closed end, an end plate on the open end of said canister, a first tubular filter disposed in said canister in radially spaced relation therewith, there being a first annular flow chamber between said canister and said first filter, a second tubular filter telescoped into and coaxial with said first filter and located in radially spaced relation with said first filter, said second filter having opposite first and second ends, there being a second annular flow chamber between said first and second filters, said second filter having filter media defining a hollow interior chamber free of any filter media and communicating with said second flow chamber by way of said media, said interior chamber extending continuously from said first end to said second end of said second filter, inlet means for admitting oil into said canister, means for preventing unfiltered oil from said inlet means from flowing directly into the interior of said first filter whereby such oil is forced to flow into said first flow chamber and through said first filter to said second flow chamber, means for permitting oil in said second flow chamber to flow out of said canister, means for preventing oil in said seocnd flow chamber from flowing directly to the interior chamber of said second filter whereby such oil is forced to flow through said second filter to the interior thereof by way of said filter media, and means for permitting oil in the interior chamber of said second filter to flow out of said canister, said second filter having an end cap at said second end located adjacent the closed end of said canister, said end cap including a portion adjacent said hollow interior chamber, and a constantly open and unrestricted warm-up orifice formed through said portion of said end cap for establishing direct communication between said first flow chamber and the interior chamber of said second filter whereby unfiltered oil from said inlet means may flow directly to the interior chamber of said second filter and bypass the filter media thereof.

* * * * *